United States Patent
Ashrafi

(10) Patent No.: US 8,503,546 B1
(45) Date of Patent: Aug. 6, 2013

(54) MULTIPLE LAYER OVERLAY MODULATION

(75) Inventor: Solyman Ashrafi, Plano, TX (US)

(73) Assignee: Quantum XTEL, Inc., Plano, TX (US)

( * ) Notice: Subject to any disclaimer, the term of this patent is extended or adjusted under 35 U.S.C. 154(b) by 966 days.

(21) Appl. No.: 12/023,965

(22) Filed: Jan. 31, 2008

(51) Int. Cl.
*H04J 3/18* (2006.01)

(52) U.S. Cl.
USPC ............................ 375/260; 375/261; 370/208

(58) Field of Classification Search
USPC .................. 375/261, 260, 298; 370/206, 203, 370/447, 478, 330, 208, 477, 205
See application file for complete search history.

(56) References Cited

U.S. PATENT DOCUMENTS

| | | | | |
|---|---|---|---|---|
| 6,044,103 | A * | 3/2000 | Weaver, Jr. ................... | 375/130 |
| 6,320,842 | B1 * | 11/2001 | Mochizuki .................... | 370/206 |
| 7,577,165 | B1 * | 8/2009 | Barrett .......................... | 370/477 |
| 2002/0080884 | A1 * | 6/2002 | Lee et al. ...................... | 375/261 |
| 2002/0080889 | A1 * | 6/2002 | Dress et al. ................... | 375/295 |
| 2009/0279418 | A1 * | 11/2009 | Scarpa et al. ................. | 370/206 |

OTHER PUBLICATIONS

F. Elbahhar, A.Rivenq-Menhaj and J.M. Rouvaen, Multi-user Ultra-Wide Band Communication System Based on Modified Gegenbauer and Hermite Functions, University of Valenciennes, France, 2005.*

* cited by examiner

*Primary Examiner* — Aristocratis Fotakis
(74) *Attorney, Agent, or Firm* — John Lindsay

(57) ABSTRACT

The present invention provides for a communication system and method that overlays signals which are simultaneously mutually orthogonal in both the time and frequency domains, thereby enhancing spectral efficiency. Whereas commonly used sinusoids provide only two mutually orthogonal functions (sine and cosine), certain polynomials provide multiple orthogonal functions, which are also finite in both time and frequency. Using multiple orders of the orthogonal functions allows overlaying signals within a symbol to generate a modulated signal carrying more information than with traditional QAM. Correlating a received signal with locally generated replicas of the orthogonal functions allows demodulation of the signal. This modulation is applicable to twisted pair, cable, fiber, satellite, broadcast and all types of wireless access. The method and system are compatible with many current and future multiple access systems, including EV-DO, UMB, WiMax, WCDMA (with or without MBMS/MIMO), HSPA Evolution, and LTE.

6 Claims, 15 Drawing Sheets

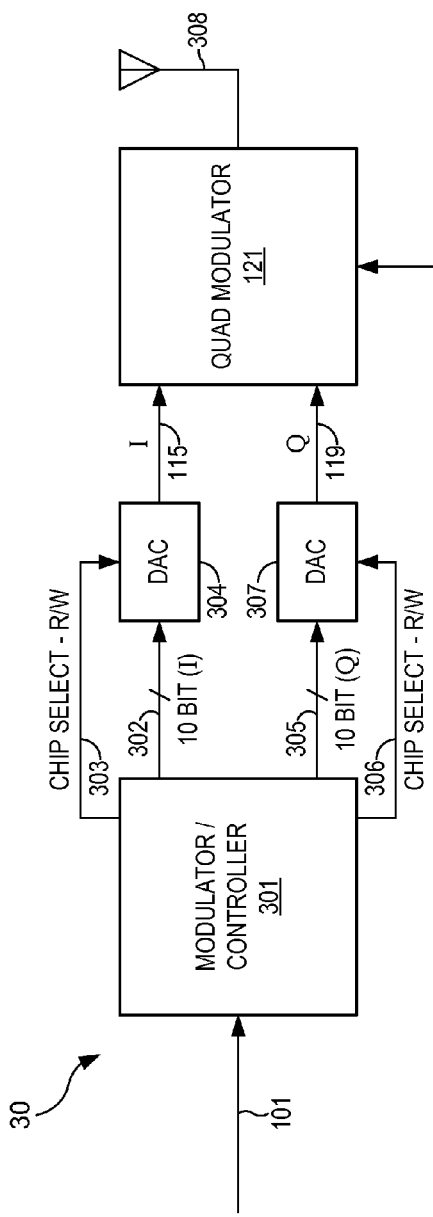
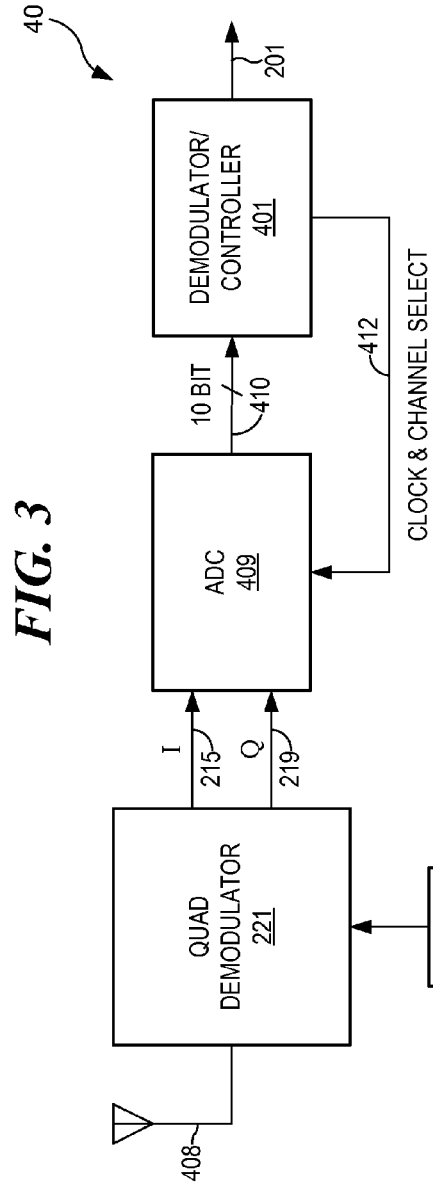
FIG. 3
FIG. 4

MULTIPLE LAYER OVERLAY MODULATION

BACKGROUND OF THE INVENTION

1. Field of the Invention

The present invention relates to communication systems and, more particularly, to modulation of data-carrying signals.

2. Description of the Related Art

The capacity of communication systems is often limited by bandwidth and bandwidth utilization efficiency. In order to make more efficient use of any bandwidth available for use by a communication system, quadrature amplitude modulation (QAM) was developed. QAM is used in many advanced multiple access (MA) systems, including code division multiple access (CDMA), wideband CDMA (WCDMA), high-speed downlink packet access (HSPDA), evolution-data optimized (EV-DO), orthogonal frequency-division multiplexing (OFDM), worldwide interoperability for microwave access (WiMAX), and long term evolution (LTE) systems. Different MA systems may use different orders of QAM, such as 2, 4, 16, 64 and 256, in which the QAM order indicates the number of different signals employed by the system. QAM uses two orthogonal Eigenfunctions, two sinusoids 90 degrees out of phase, within the same frequency band.

For example, conventional 64 QAM channel encoding and modulation uses eight discrete levels for each of the sinusoids. First, a stream of digital data with logical 0's and 1's is converted to two streams, an in-phase (I) and quadrature phase (Q) signal, each with discrete levels. Each data symbols in the I or Q stream represents three bits of the original digital data source. ($2^3$=8) Then, each symbol in each of the I and Q streams is modulated with a raised cosine filter to taper the signal, so that a time-domain waveform of the signal will be confined to the duration of the symbol. As a result, the footprints of the signals in the frequency domain will also be tapered to minimize interference with adjacent frequency channels. The I and Q signal streams are then converted to analog signals and used to modulate the in-phase (for example, cosine) and quadrature (for example, sine) components of a carrier signal. The modulated carrier components are summed to produce the 64 QAM signal, which may further be used to modulate a radio frequency (RF) signal.

To demodulate a 64 QAM signal, the RF signal is down-converted to baseband, for example, by using a quadrature down converter. The I and Q streams of baseband signal are digitized, and the energy of each symbol in the I and Q digital streams is determined by filtering and integrating over the symbol duration. The detected energy indicates the symbol value in each of the I or Q streams, which is then mapped into logical 0's and 1's. The digital data streams demodulated from the I and Q dimensions are multiplexed into a single stream to form the final demodulated digital data.

Prior to the advent of wavelet analysis techniques, communication theory was predominantly based on two methods of signal analysis. Signals were typically either modeled as functions of time at precisely defined at moments, or as functions of frequency, with ideal accuracy in frequency. Narrowband and wideband ambiguity functions, which enable representation of signals as both functions of time and frequency, are related to wavelet transforms. Wideband ambiguity functions are essentially affine wavelet transforms and narrowband ambiguity functions can be considered to be Heisenberg wavelet transforms. Wavelet transforms can be defined as time-frequency localization operators that treat the time-frequency plane as a notional two-dimensional space, rather than as two separate one-dimensional axes. In the case of narrowband ambiguity functions, time delayed and Doppler-shifted signals can be analyzed using a reference signal, g(t). Thus, a narrowband ambiguity function can be interpreted as a generalized Gabor transform of a received signal with respect to a reference signal. Gabor transforms have fundamental significance in physics and information theory, and may be referred to as the Heisenberg wavelet transform.

SUMMARY OF THE INVENTION

The present invention provides for a new modulation technique, Multiple Level Overlay (MLO), which increases the spectral efficiency of communication links, whether wired, optical, or wireless. MLO may be used along with many existing modulation techniques, for example quadrature amplitude modulation (QAM), by extending the in-phase (I) and quadrature phase (Q) dimensions of the signal space.

BRIEF DESCRIPTION OF THE DRAWINGS

For a more complete understanding of the present invention and the advantages thereof, reference is now made to the following Detailed Description taken in conjunction with the accompanying drawings, in which:

FIG. 3 illustrates an embodiment of an MLO transmitter system;

FIG. 4 illustrates an embodiment of an MLO receiver system;

DETAILED DESCRIPTION

Figure 1:
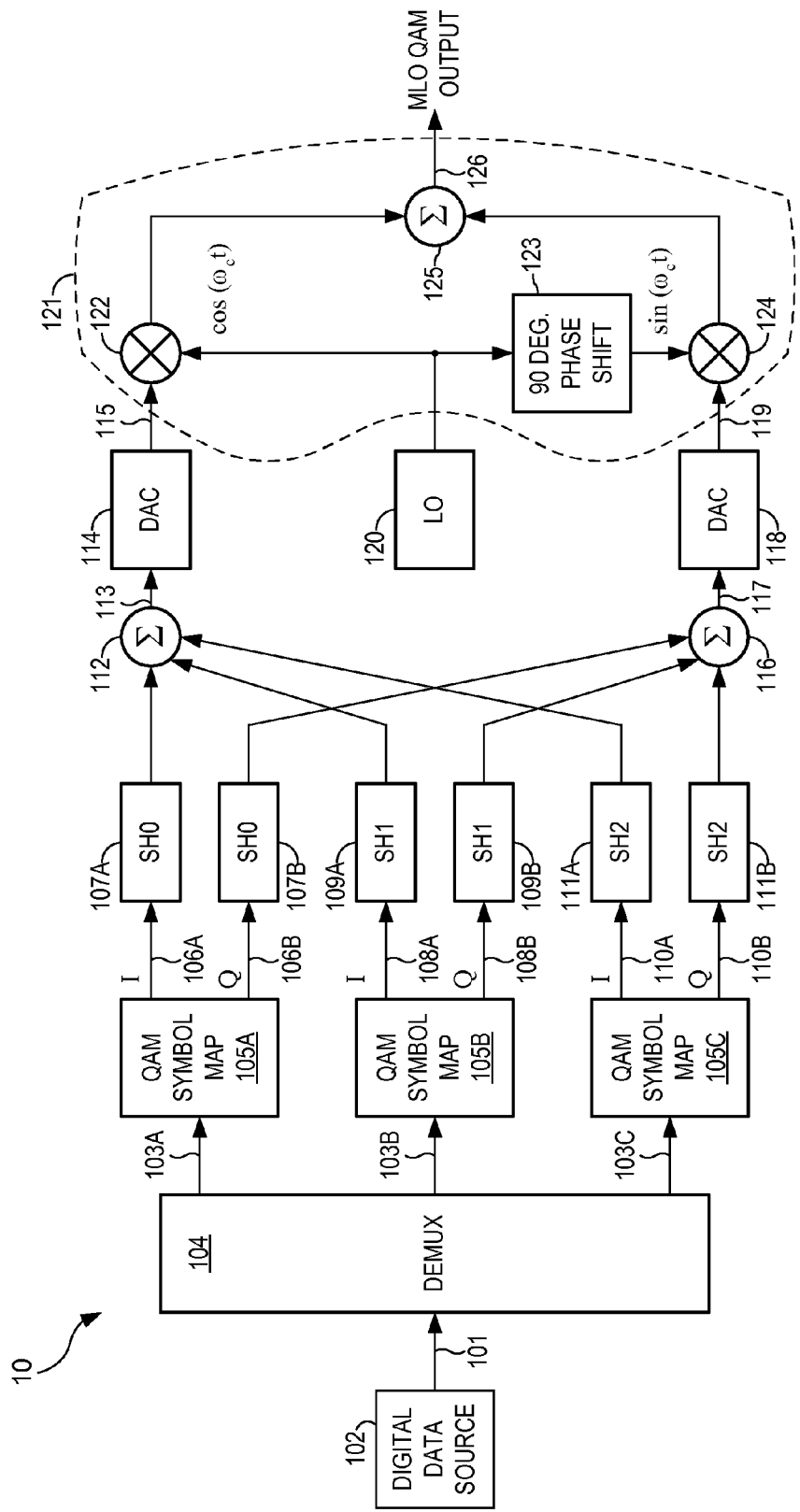
FIG. 1 illustrates an embodiment of an Multiple Level Overlay (MLO) modulation system.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details have been omitted insofar as they are not considered necessary to obtain an understanding of the present invention, and are considered to be within the understanding of persons of ordinary skill in the relevant art.

The present invention provides for a new modulation technique, Multiple Level Overlay (MLO), which increases the spectral efficiency of communication links, whether wired, optical, or wireless. Rather than modeling signals as fixed in either time or frequency, a more general approach may be used. Signals may be modeled with two degrees of freedom, with time, t, and frequency, f, as independent variables in a two-dimensional notional space, defining orthogonal axes in an information diagram. Prior modeling methods, using either fixed time or fixed frequency, may be considered to be limiting cases of the general approach, aligning the signal model with either the time axis or the frequency axis in the two-dimensional space. However, by using an information diagram paradigm, signals may be differentiated in the two-dimensional space, rather than merely along one axis. Thus, the information-carrying capacity of a communication channel may be determined by the number of signals, which occupy different time and frequency coordinates, and may be differentiated in a notional two-dimensional space.

Within this notional two-dimensional space, minimization of the time-bandwidth product, i.e. the area occupied by a signal in the space, enables denser packing, and thus the use of more signals, with a resulting higher information-carrying capacity, within an allocated channel. Given the frequency channel $\Delta f$, a signal transmitted through it in minimum time $\Delta t$ will have an envelope described by certain time-bandwidth minimizing signals. The time-bandwidth products for these signals take the following form:

$$\Delta t \Delta f = \frac{1}{2}(2n + 1)$$

where n is an integer ranging from 0 to infinity, denoting the order of a signal.

These signals form an orthogonal set of infinite elements, wherein each has a finite amount of energy. They are finite in both the time domain and the frequency domain, and can be detected from a mix of other signals and noise through correlation, for example by matched filtering. Unlike other wavelets, though, some orthogonal signals may have similar time and frequency forms.

Hermite polynomials are a classical orthogonal polynomial sequence, which are the Eigenstates of a quantum harmonic oscillator. Signals based on Hermite polynomials possess the minimal time-bandwidth product property described above, and may be used for embodiments of MLO systems. However, it should be understood that other signals may also be used, for example orthogonal polynomials such as Jacobi polynomials, Gegenbauer polynomials, Legendre polynomials, Chebyshev polynomials, and Laguerre polynomials. Q-functions are another class of functions that can be employed as a basis for MLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Because signals with different orders are mutually orthogonal, they can be overlaid to increase the spectral efficiency of a communication channel. For example, when n=0, the optimal baseband signal will have a time-bandwidth product of ½, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an MLO system uses functions based on modified Hermite polynomials, $\Psi_n$, and are defined by:

$$\psi_n(t,\xi) = \frac{(\tanh\xi)^{n/2}}{2^{n/2}(n!\cosh\xi)^{1/2}} e^{\frac{1}{2}t^2[1-\tanh\xi]} H_n\left(\frac{t}{\sqrt{2\cosh\xi\sinh\xi}}\right)$$

where t is time, and $\xi$ is a bandwidth utilization parameter. Plots of $\Psi_n$ for n ranging from 0 to 9, along with their Fourier transforms, are shown in FIGS. 5A-5K. The orthogonality of different orders of the functions may be verified by integrating:

$$\int\int \psi_n(t,\xi)\psi_m(t,\xi)dt d\xi$$

The Hermite polynomial is defined by the contour integral:

$$H_n(z) = \frac{n!}{2\pi i}\oint e^{-t^2+2tz}t^{-n-1}dt,$$

where the contour encloses the origin and is traversed in a counterclockwise direction. Hermite polynomials are described in *Mathematical Methods for Physicists*, by George Arfken, for example on page 416, the disclosure of which is incorporated by reference. The first 11 Hermite polynomials are:

$H_0(x)=1$
$H_1(x)=2x$
$H_2(x)=4x^2-2$
$H_3(x)=8x^3-12x$
$H_4(x)=16x^4-48x^2+12$
$H_5(x)=32x^5-160x^3+120x$
$H_6(x)=64x^6-480x^4+720x^2-120$
$H_7(x)=128x^7-1344x^5+3360x^3-1680x$
$H_8(x)=256x^8-3584x^6+13440x^4-13440x^2+1680$
$H_9(x)=512x^9-9213x^7+48384x^5-80640x^3+30240x$
$H_{10}(x)=1024x^{10}-23040x^8+161280x^6-403200x^4+302400x^2-30240$ which may be extended to any order, using the recursion relationship:
$H_{x+1}(x)=2xH_x(x)-2nH_{n-1}(x)$ Turning now to FIG. 1, the reference numeral 10 generally indicates an embodiment of an MLO modulation system, although it should be understood that the term MLO and the illustrated system 10 are examples of embodiments. System 10 takes as input an input data stream 101 from a digital data source 102, which is separated into three parallel, separated data streams 103a-103c of logical 1's and 0's by input stage demultiplexer (demux) 104. Data stream 101 may represent a data file to be transferred, or an audio or video data stream. It should be understood that a greater or lesser number of separated data streams may be used. In some embodiments, each of separated data streams 103a-103c has a data rate of 1/N of the original rate, where N is the number of parallel data streams. In the embodiment illustrated in FIG. 1, N is 3.

Each of separated data streams 103a-103c is mapped to a quadrature amplitude modulation (QAM) symbol in an M-QAM constellation, for example 16 QAM or 64 QAM, by one of the QAM symbol mappers 105a-c. The QAM symbol mappers 105a-c are coupled to respective outputs of demux 104, and produce parallel in-phase (I) 106a, 108a, and 110a and quadrature phase (Q) 106b, 108b, and 110b data streams at discrete levels. For example, if 64-QAM is used, each I and Q channel uses eight discrete levels to transmit three bits per symbol. Each of the three I and Q pairs, 106a-106b, 108a-108b, and 110a-110b is used to weight the output of a corresponding pair of function generators 107a-107b, 109a-109b and 111a-111b, which in some embodiments generate signals such as the modified Hermite polynomials described above and weight them based on the amplitude value of input symbols. This produces 2N weighted or modulated signals, each carrying a portion of the data originally from incoming data stream 101, and is in place of modulating each symbol in the I and Q pairs, 106a-106b, 108a-108b, and 110a-110b with a raised cosine filter, as would be done for a prior art QAM system. In the illustrated embodiment, three signals are used, SH0, SH1 and SH2, which correspond to modifications of $H_0$, $H_1$, and $H_2$, respectively, although it should be understood that different signals may be used in other embodiments.

The weighted signals are not sub-carriers, but rather are sub-layers of a modulated carrier, and are then combined, superimposed in both frequency and time, using summers 112 and 116, without mutual interference in each of the I and Q dimensions, due to the signal orthogonality. Summers 112 and 116 act as signal combiners to produce composite signals 113 and 117. The weighted orthogonal signals are used for both I and Q channels, which have been processed equivalently by system 10, and are summed before the QAM signal is transmitted. Therefore, although new orthogonal functions are used, some embodiments additionally use QAM for transmission. Because of the tapering of the signals in time-domain, as will be shown in FIGS. 5A-5K, the time-domain waveform of the weighted signals will be confined to the durations of the symbols. Further, because of the tapering of the special signals in frequency-domain, the signal will also be confined in frequency-domain, minimizing interference with signals in adjacent channels.

The composite signals 113 and 117 are converted to analog signals 115 and 119, using digital-to-analog converters 114 and 118, and are then used to modulate a carrier signal at the frequency of local oscillator (LO) 120, using modulator 121. Modulator 121 comprises mixers 122 and 124, coupled to DACs 114 and 118, respectively. 90-degree phase shifter 123 converts the signal from LO 120 into a Q component of the carrier signal. The outputs of mixers 122 and 125 are summed in summer 125, to produce output signal 126.

MLO can be used with a variety of transport mediums, such as wire, optical, and wireless, and may be used in conjunction with QAM. This is because MLO uses spectral overlay of various signals, rather than spectral overlap. Bandwidth utilization efficiency may be increased by an order of magnitude, through extension of available spectral resources into multiple layers. The number of orthogonal signals is increased from two, cosine and sine, in the prior art, to a number limited by the accuracy and jitter limits of generators used to produce the orthogonal polynomials. In this manner, MLO extends each of the I and Q dimensions of QAM, phase shift keying (PSK), quadrature PSK (QPSK), code division multiple access (CDMA), wideband CDMA (WCDMA), high-speed downlink packet access (HSPDA), evolution-data optimized (EV-DO), orthogonal frequency-division multiplexing (OFDM), worldwide interoperability for microwave access (WiMAX), and long term evolution (LTE) systems. MLO may be further used in conjunction with other Multiple Access (MA) schemes, such as frequency division duplexing (FDD), time division duplexing (TDD), frequency division MA (FDMA), and time division MA (TDMA), by squeezing the states of a harmonic oscillator potential. Overlaying individual orthogonal signals over the same frequency band allows creating a virtual bandwidth wider than the physical bandwidth, thus adding a new dimension to signal processing. This modulation is applicable to twisted pair, cable, fiber, satellite, broadcast and all types of wireless access. The method and system are compatible with many current and future multiple access systems, including EV-DO, UMB, WiMax, WCDMA (with or without multimedia broadcast multicast service (MBMS)/multiple input multiple output (MIMO)), HSPA Evolution, and LTE.

Figure 2:
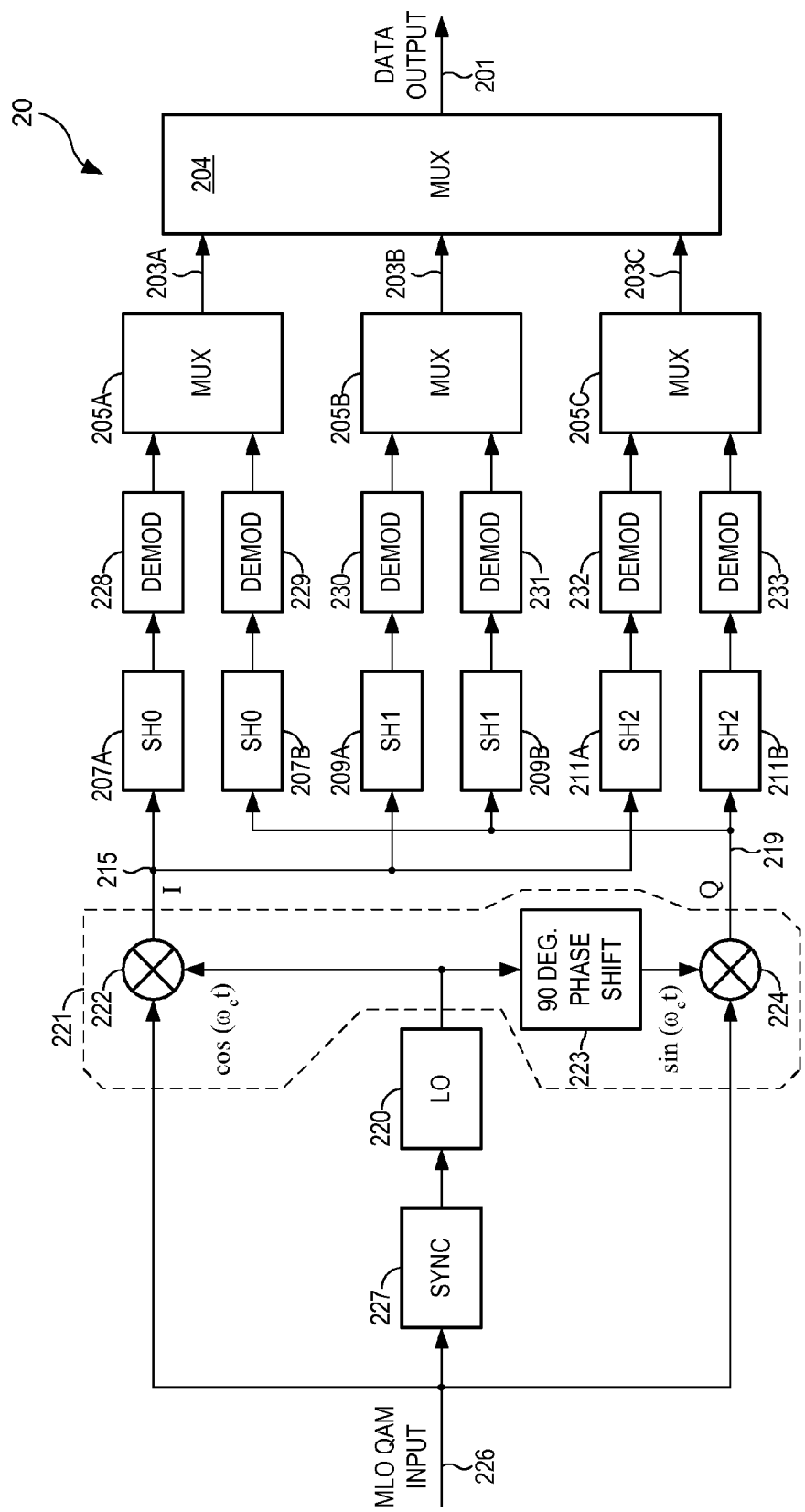
FIG. 2 illustrates an embodiment of an MLO demodulation system.

Turning now to FIG. 2, the reference numeral 20 generally indicates an embodiment of an MLO demodulator, although it should be understood that the term MLO and the illustrated system 20 are examples of embodiments. System 20 takes as input an MLO signal 226, which may be similar to output signal 126 from system 10. Synchronizer 227 extracts phase information, which is input to LO 220 to maintain coherence, so that demodulator 221 can produce baseband analog I signal 215 and Q signal 219. Demodulator 221 comprises mixers 222 and 224, which is coupled to LO 220 through 90-degree phase shifter 223. I signal 215 is input to each of signal filters 207a, 209a and 211a, and Q signal 219 is input to each of signal filters 207b, 209b and 211b. Since the orthogonal functions are known, they can be separated using correlation or other techniques, to recover the modulated data. Information in each of the I and Q signals 215 and 219 can be extracted from the overlapped functions, which have been summed within each of the symbols, because the functions are orthogonal in a correlative sense, rather than a time displaced sense, as in CDMA, or a frequency position displaced sense, as in OFDM.

In some embodiments, signal filters 207a-207b, 209a-209b and 211a-211b use locally generated replicas of the polynomials as known signals in matched filters. The outputs of the matched filters are the recovered data bits, for example equivalents of the QAM symbols 106a-106b, 108a-108b, and 110a-110b of system 10. Signal filters 207a-207b, 209a-209b and 211a-211b produce 2N streams of N I and Q signal pairs, which are input into demodulators 228-233. Demodulators 228-233 integrate the energy in their respective input signals to determine the value of the QAM symbol, and hence the logical 1's and 0's data bit stream segment represented by the determined symbol. The outputs of demodulators 228-233 are then input into multiplexers (muxes) 205a-205c, to generate data streams 203a-203c. If system 20 is demodulating a signal from system 10, data streams 203a-203c correspond to data streams 103a-103c. Data streams 203a-203c are the multiplexed by mux 204, to generate data output stream 201.

MLO may be differentiated from CDMA and OFDM by the manner in which orthogonality among signals is achieved. MLO signals are mutually orthogonal in both the time and frequency domains and can be overlaid in the same symbol time-bandwidth product. Orthogonality is obtained by the correlation properties, for example by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and use time inter-symbol orthogonal code sequences to distinguish individual users, and OFDM assigns unique signals to each user but which are not overlaid, are only orthogonal in the frequency domain. Neither CDMA nor OFDM increases bandwidth efficiency. CDMA uses more bandwidth than is necessary to transmit data, when the signal has a low signal to noise ratio (SNR). OFDM spreads data over many subcarriers to achieve superior performance in multipath radio frequency environment. OFDM uses a cyclic prefix OFDM to mitigate multi-path effects and a guard time to minimize Inter-Symbol Interference (ISI), and each channel is mechanistically made to behave as if the transmitted waveform is orthogonal.

In contrast, embodiments of MLO use a set of functions which effectively form an alphabet that provide more usable channels in the same bandwidth, thereby enabling high bandwidth efficiency. Some embodiments of MLO do not require the use of cyclic prefixes or guard times, and therefore outperform OFDM in spectral efficiency, peak-to-average power ratio, and power consumption, and requires fewer operations per bit transmitted. In addition, embodiments of MLO are more tolerant of amplifier non-linearities than are CDMA and OFDM systems.

FIG. 3 illustrates an embodiment of an MLO transmitter system 30, which receives input data stream 101. System 30 comprises a modulator/controller 301, which incorporates equivalent functionality of demux 104, QAM symbol mappers 105a-c, function generators 107a-107b, 109a-109b and 111a-111b, and summers 112 and 116 of system 10, shown in FIG. 1. However it should be understood that modulator/controller 301 may use a greater or lesser quantity of signals than the three illustrated in system 10. Modulator/controller 301 may comprise an application specific integrated circuit (ASIC), a field programmable gate array (FPGA), and/or other components, whether discrete circuit elements or integrated into a single integrated circuit (IC) chip.

Modulator/controller 301 is coupled to DACs 304 and 307, communicating a 10 bit I signal 302 and a 10 bit Q signal 305, respectively. In some embodiments, I signal 302 and Q signal 305 correspond to composite signals 113 and 117 of system 10. It should be understood, however, that the 10 bit capacity of I signal 302 and Q signal 305 is merely representative of an embodiment. As illustrated, modulator/controller 301 also controls DACs 304 and 307 using control signals 303 and 306, respectively. In some embodiments, DACs 304 and 307 each comprises an AD5433, complementary metal-oxide-semiconductor (CMOS) 10 bit current output DAC, which is illustrated in greater detail in FIG. 10, or else a functional equivalent of an AD5433. In some embodiments, multiple control signals are sent to each of DACs 304 and 307.

DACs 304 and 307 output analog signals 115 and 119 to quadrature modulator 121, which is coupled to LO 120. In some embodiments, modulator 121 comprises an AD8346, which is illustrated in greater detail in FIG. 11, or else a functional equivalent of an AD8346. The output of modulator 121 is illustrated as coupled to an antenna 308 to transmit data wirelessly, although in some embodiments, modulator 121 may be coupled to a fiber optic modem, a twisted pair, a coaxial cable, or another suitable transmission medium.

FIG. 4 illustrates an embodiment of an MLO receiver system 40, capable of receiving and demodulating signals from system 30. System 40 receives an input signal from an antenna 408, although it should be understood that another input medium, such as wired or optical, may be used. Demod 221, driven by LO 220, converts the input to baseband I signal 215 and Q signal 219. In some embodiments, demod 121 comprises an AD8347, which is illustrated in greater detail in FIG. 12, or else a functional equivalent of an AD8347. I signal 215 and Q signal 219 are input to analog to digital converter (ADC) 409. In some embodiments, ADC 409 comprises an AD9201, which is illustrated in greater detail in FIG. 13, or else a functional equivalent of an AD9201.

ADC 409 outputs 10 bit signal 410 to demodulator/controller 401, and receives a control signal 412 from demodulator/controller 401. Demodulator/controller 401 may comprise an application specific integrated circuit (ASIC), a field programmable gate array (FPGA), and/or other components, whether discrete circuit elements or integrated into a single integrated circuit (IC) chip. Demodulator/controller 401 correlates received signals with locally generated replicas of the signal set used, in order to perform demodulation and identify the symbol sent. Demodulator/controller 401 also estimates frequency errors and recovers the data clock, which is used to read data from the ADC 409. The clock timing is sent back to ADC 409 using control signal 412, enabling ADC 409 to segment the digital I and Q signals 215 and 219. In some embodiments, multiple control signals are sent by demodulator/controller 401 to ADC 409. Demodulator/controller 401 also outputs data signal 201.

Figure 5A:
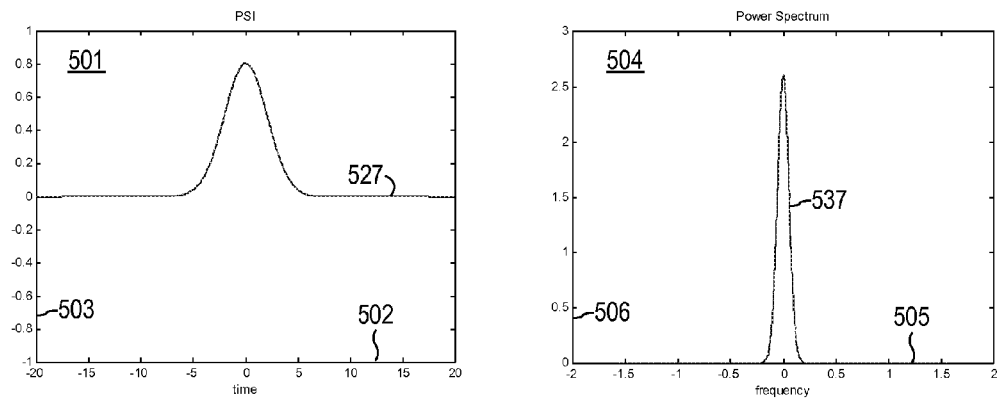
FIGS. 5A-5K illustrate representative MLO signals and their respective spectral power densities.

FIGS. 5A-5K illustrate representative MLO signals and their respective spectral power densities, based on the modified Hermite polynomials, $\Psi_n$, for n ranging from 0 to 9. FIG. 5A shows plots 501 and 504. Plot 501 comprises a curve 527 representing $\Psi_0$, plotted against a time axis 502 and an amplitude axis 503. As can be seen in plot 501, curve 527 approximates a Gaussian curve. Plot 504 comprises a curve 537 representing the power spectrum of $\Psi_0$, plotted against a frequency axis 505 and a power axis 506. As can be seen in plot 504, curve 537 also approximates a Gaussian curve. Frequency domain curve 537 is generated using a Fourier transform of time domain curve 527. The units of time and frequency on axes 502 and 505 are normalized for baseband analysis, although it should be understood that since the time and frequency units are related by the Fourier transform, a desired time or frequency span in one domain dictates the units of the corresponding curve in the other domain. For example, various embodiments of MLO systems may communicate using symbol rates in the Megahertz (MHz) or Gigahertz (GHz) ranges, and the non-zero duration of a symbol represented by curve 527, i.e. the time period during which curve 527 is above zero, would be compressed to the appropriate length calculated using the inverse of the desired symbol rate. For an available bandwidth in the MHz range, the non-zero duration of a time domain signal will be in the microsecond range.

FIGS. 5B-5J show plots 507-524, with time domain curves 528-536 representing $\Psi_1$ through $\Psi_9$, respectively, and their corresponding frequency domain curves 538-546. As can be seen in FIGS. 5A-5J, the number of peaks in the time domain plots, whether positive or negative, corresponds to the number of peaks in the corresponding frequency domain plot. For example, in plot 523 of FIG. 5J, time domain curve 536 has five positive and five negative peaks. In corresponding plot 524 therefore, frequency domain curve 546 has ten peaks.

Figure 5B:
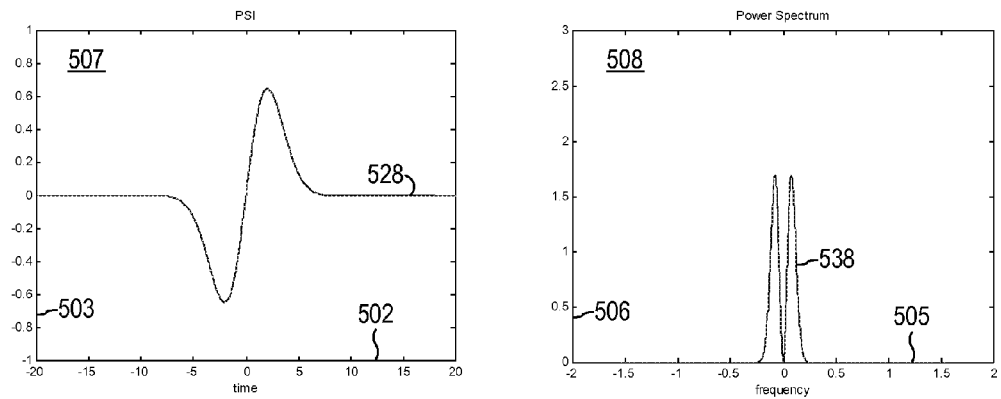
Figure 5C:
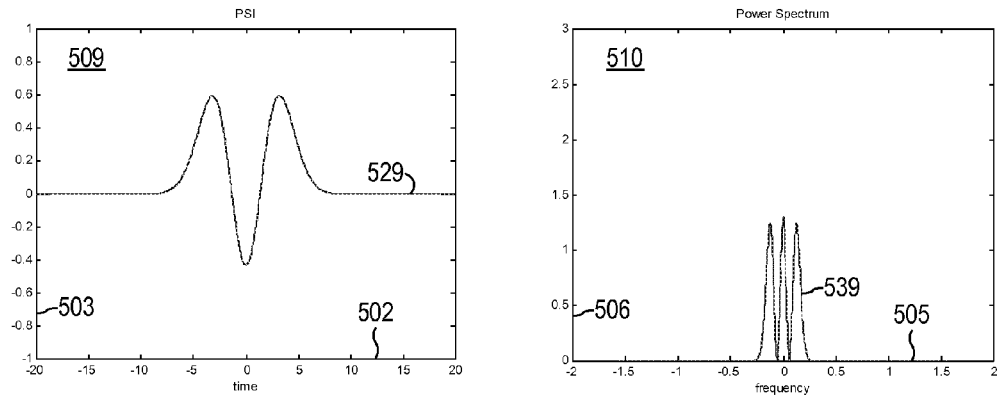
Figure 5D:
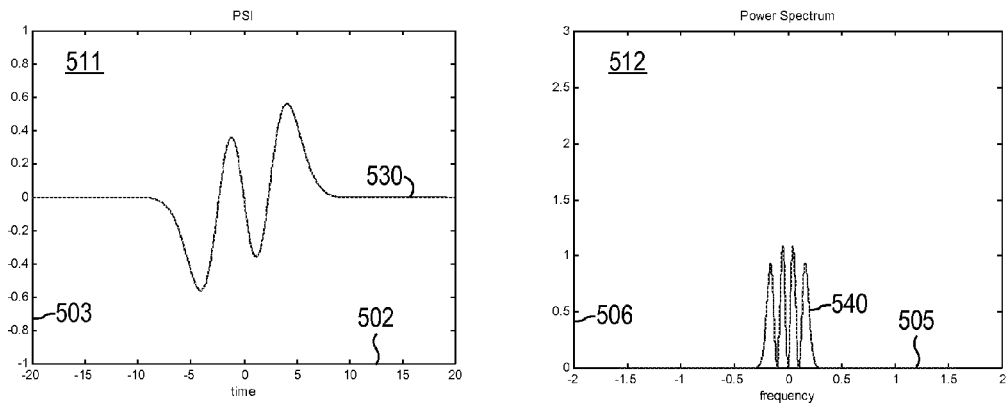
Figure 5E:
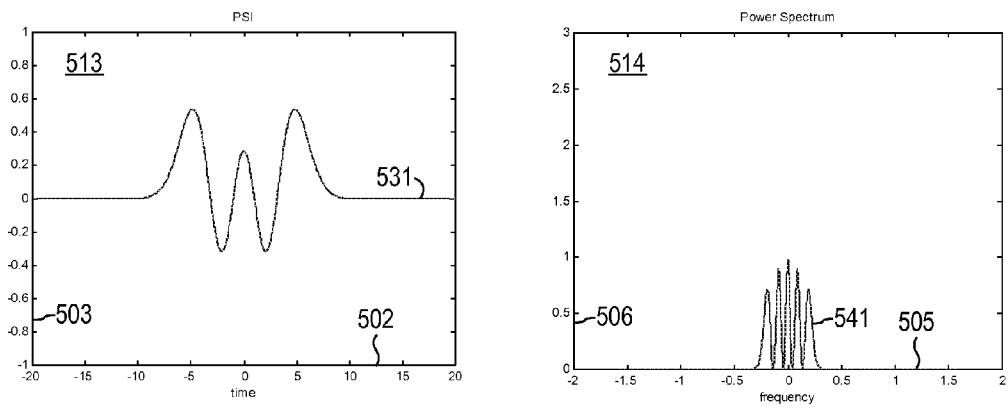
Figure 5F:
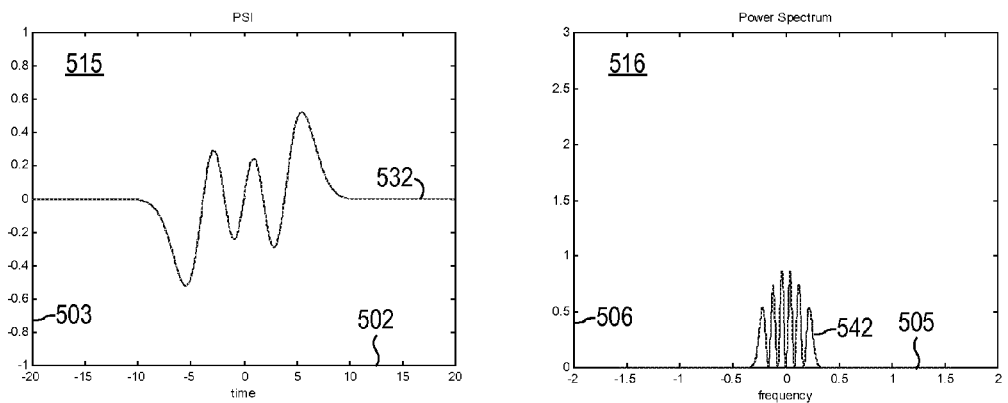
Figure 5G:
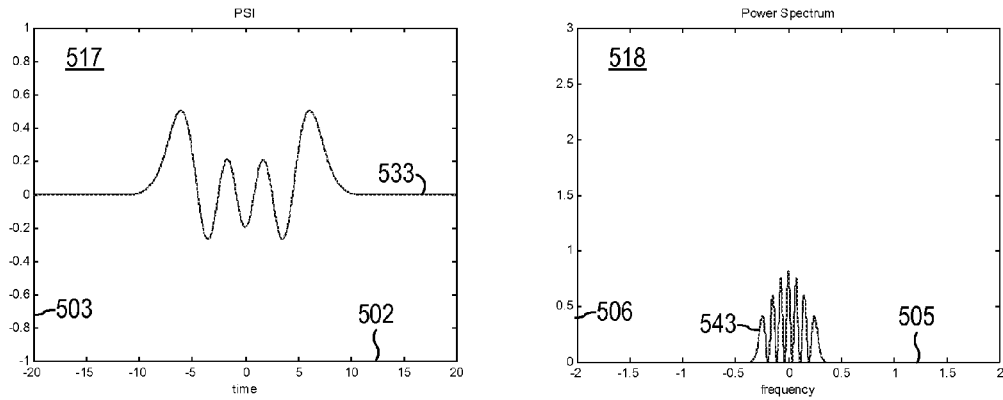
Figure 5H:
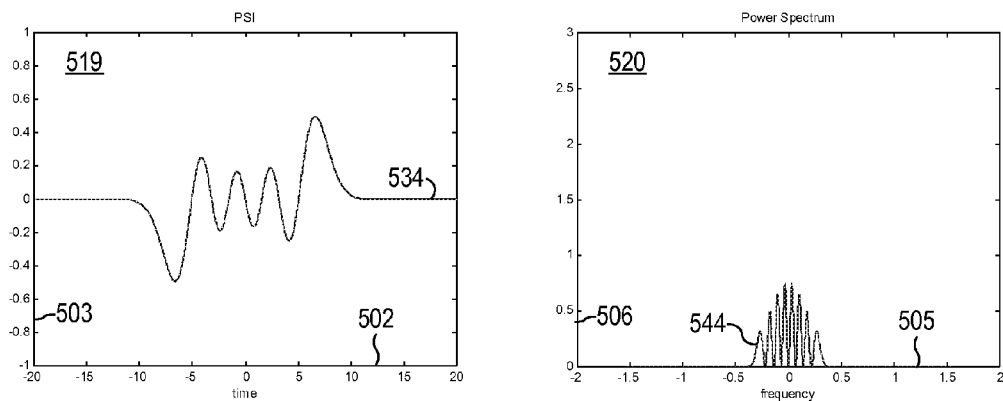
Figure 5I:
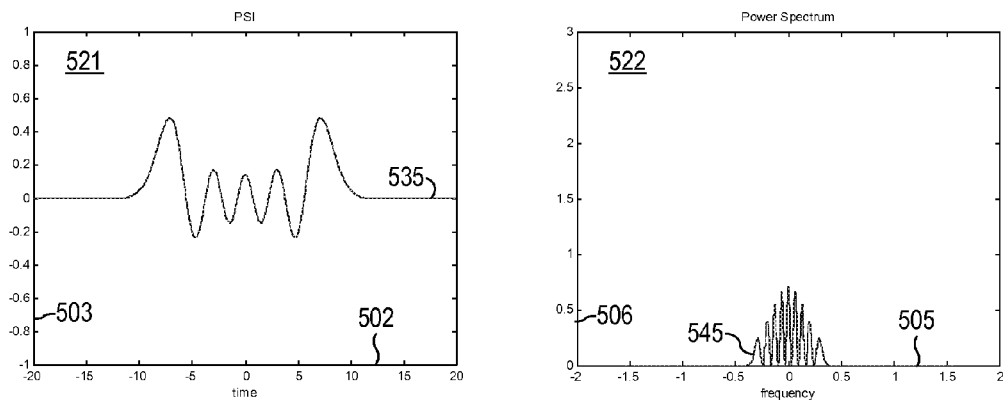
Figure 5J:
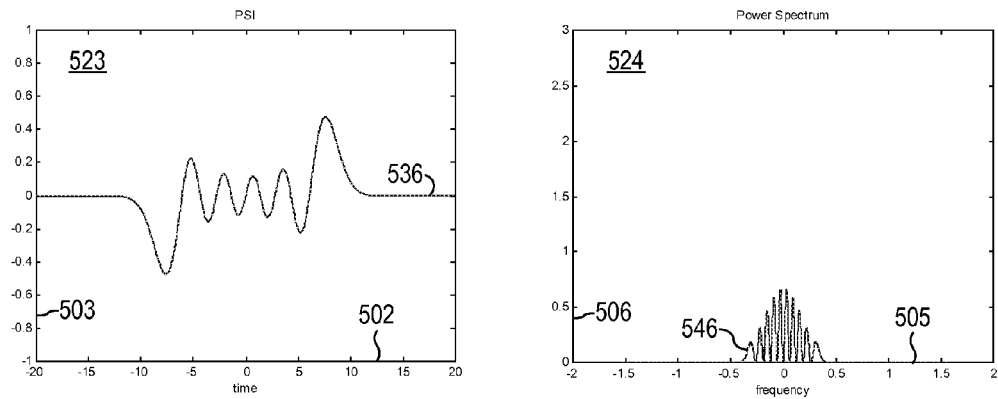
Figure 5K:
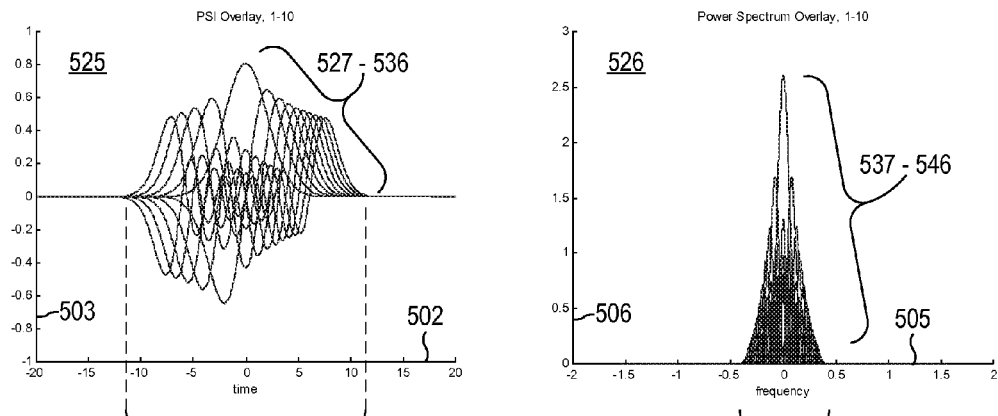

FIG. 5K shows overlay plots 525 and 526, which overlay curves 527-536 and 537-546, respectively. As indicated in plot 525, the various time domain curves have different durations. However, in some embodiments, the non-zero durations of the time domain curves are of similar lengths. For an MLO system, the number of signals used represents the number of overlays and the improvement in spectral efficiency. It should be understood that, while ten signals are disclosed in FIGS. 5A-5K, a greater or lesser quantity of signals may be used, and that further, a different set of signals, rather than the $\Psi_n$ signals plotted, may be used.

Plots 501-526 can be generated using the following algorithms:

```
% Generate plots of PSI_functions ksi=1;
        t =-20:0.01:20;
        for n=1:10
            figure(n);
            psi(n,:)= psiprogn((n-1),t,ksi);
            plot(beta(1:4000),psi(n,1:4000));
            title('PSI');
            xlabel('time');
            axis([-20 20 -1 1]);
        end
        figure(11);
        hold;
        title('PSI Overlay, 1-10');
        xlabel('time');
        axis([-20 20 -1 1]);
        for n=1:10
            plot(beta(1:4000),psi(n,1:4000));
        end
        ***
        % Generate plots of PSI_function FFTs
        ksi=1;
        t =-20:0.01:20;
        for n=1:10
            figure(n+11);
            psi= psiprogn((n-1),t,ksi);
            f = 100*(0:1024)/65536;
            f=[-1*fliplr(f(2:1025)) f];
            PSI=fft(psi,65536);
            Pxx = PSI.* conj(PSI)/65536;
            Pxx = Pxx(1:1025);
            Pxx = [fliplr(Pxx(2:1025)) Pxx];
            Pyy(n,:) = Pxx;
            plot(f,Pyy(n,:));
            title('Power Spectrum');
            xlabel('frequency');
            axis([-2 2 0 3]);
        end
        figure(11+11);
        hold
        title('Power Spectrum Overlay, 1-10');
        xlabel('frequency');
        axis([-2 2 0 3]);
        for n=1:10
            plot(f,Pyy(n,:));
        end
        ***
        function zf=psiprogn(n,beta,ksi)
        %modified Hermite n function
        y=beta./sqrt(2*cosh(ksi).*sinh(ksi));
        z=polyval(HermitePoly(n),y);
        zf=(tanh(ksi)).^(n/2);
        zf=zf/(2^(n/2)*(factorial(n).*cosh(ksi)).^0.5);
        e=-0.5*beta.^2;
        e=e*(1-tanh(ksi));
        e1=exp(e);
        zf=zf*e1;
        zf=zf.*z;
        ***
        function Hn = HermitePoly(n)
        % Hermite polynomial coefficient generator.
        % Evaluate H_n(x) using polyval(HermitePoly(n),x)
```

-continued

```
        if (n==0)
            Hn=1;
        elseif (n==1)
            Hn=[2 0];
        else
            Hnm2=zeros(1,n+1);
            Hnm2(n+1)=1;
            Hnm1=zeros(1,n+1);
            Hnm1(n)=2;
            for k=2:n
                Hn=zeros(1,n+1);
                for m=n-k+1:2:n
                    Hn(m)=2*(Hnm1(m+1)-(k-1)*Hnm2(m));
                end
                Hn(n+1)=-2*(k-1)*Hnm2(n+1);
                if k<n
                    Hnm2=Hnm1;
                    Hnm1=Hn;
                end
            end
        end
        ***
```

Figure 6:
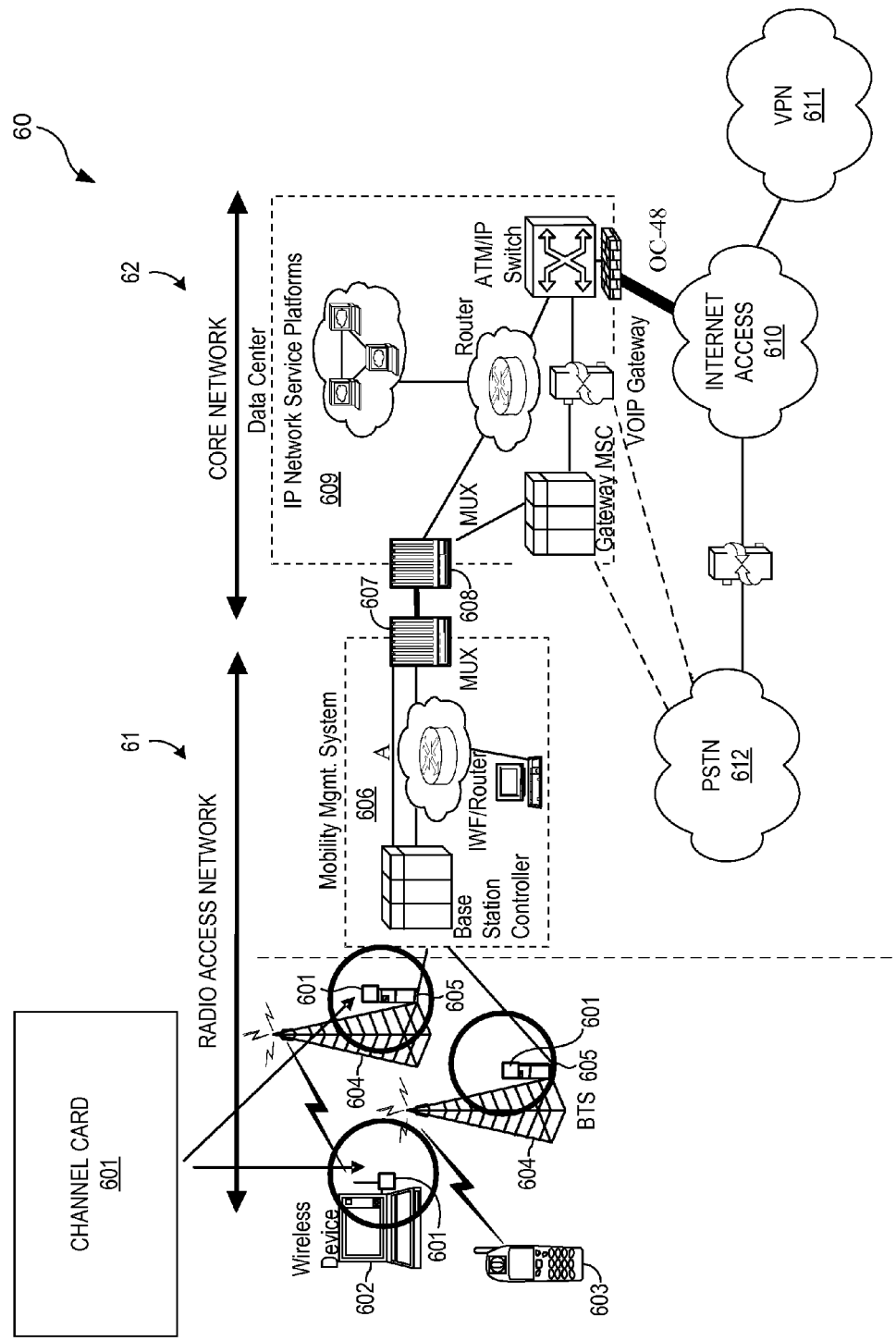
FIG. 6 illustrates an embodiment of an MLO system in a radio access network (RAN)

FIG. 6 illustrates an embodiment of an MLO system in a communication network 60, including a radio access network (RAN) 61 and a core network 62. Communication system 60 illustrates an example of modifying an existing system using MLO for a segment having limited bandwidth. RAN 61 uses a channel card 601, which implements an embodiment of an MLO system. Three cards 601 are illustrated, on in a wireless device 602, and one at each of two base stations 604, within base station communication equipment 605. Wireless device 603, in communication with a base station 604, is modified to incorporate MLO technology. RAN 61 includes a mobility management system 606, which is coupled to base station communication equipment 605. Mobility management system 606 comprises a mux 607 in communication with a mux 608 in data center 609 of core network 62. Data center 609 is in communication with the internet 610, a virtual private network (VPN) 611, and a public switched telephone network (PSTN) 612. Using the connectivity illustrated in FIG. 6, an embodiment of an MLO system can leverage existing infrastructure to enhance bandwidth efficiency at a critical point in communication network 60, indicated in FIG. 6 as the wireless stage of network 60. However, it should be understood that MLO could be used for any segment or segments of network 60.

Figure 7:
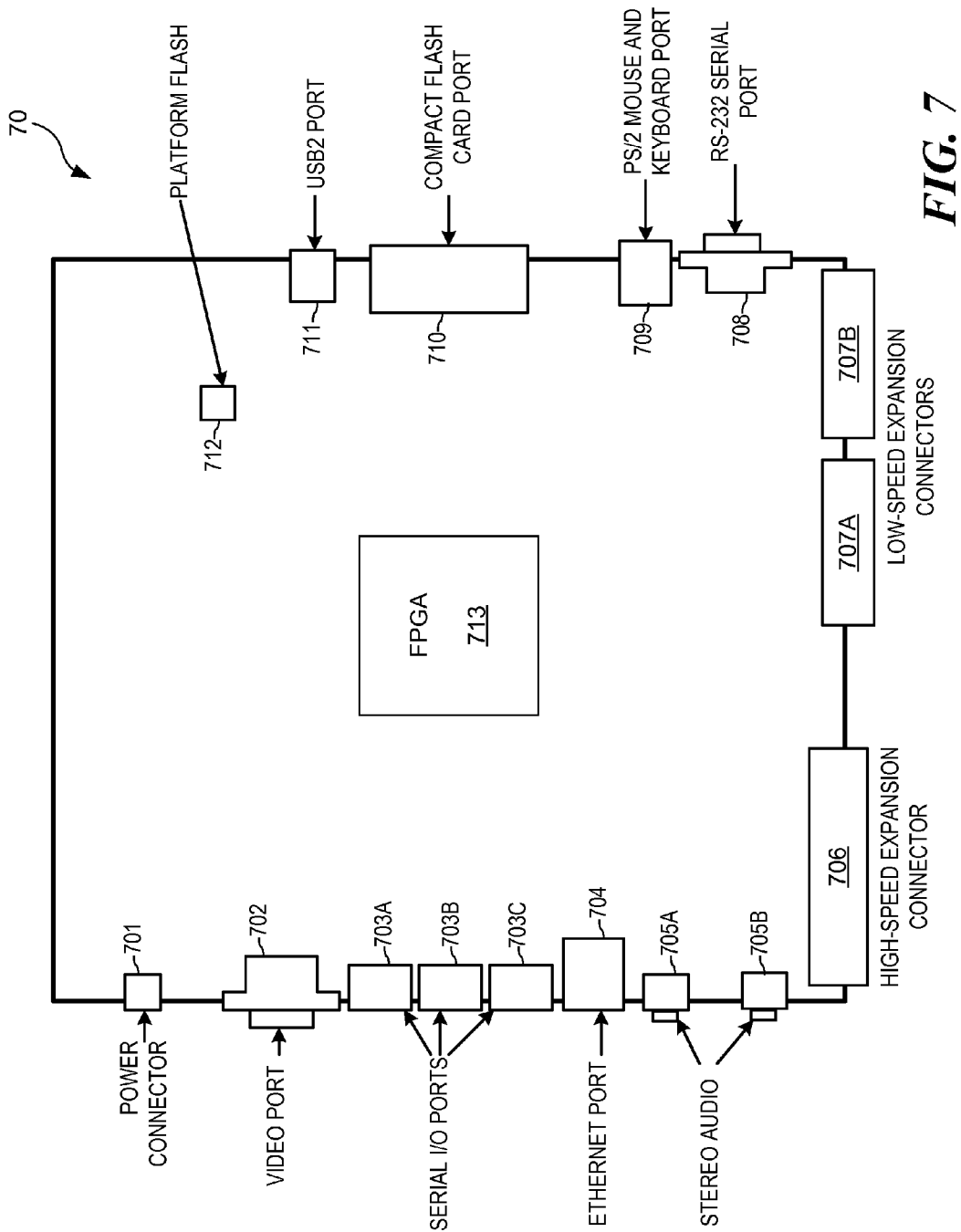
FIG. 7 illustrates an embodiment of an MLO system controller.

FIG. 7 illustrates an embodiment of an MLO system controller card 70, which performs at least some of the functions of channel card 601 of network 60. Card 70 comprises a power connector 701, a video port 702, serial ports 703A-703C, an Ethernet port 704, audio ports 705A-705B, a high speed connector 706, low speed connectors 707A-707B, an RS-232 port 708, a user device input port 709, a flash card port 710, a USB port 711, a flash memory 712, and an FPGA 713. It should be understood that card 70 is illustrative of an embodiment of an MLO system, and that, in some embodiments, certain illustrated components may be omitted and other components may be added.

Power connector 701 provides operational power for card 70, and video port 702 may provide output video, either data or control information, or be used for video input if card 70 is used for transmitting video data. Similarly, audio ports 705A-705B may provide output control data, such as tones and alert signals, or be used for data input/output (I/O). Serial ports 703A-703C, Ethernet port 704, high speed connector 706, low speed connectors 707A-707B, RS-232 port 708, and USB port 711 are coupled to FPGA 713, and may be used for system control and/or data (I/O). For example, any of the ports and connectors could be used for any of previously-described signals 101, 115, 119, 126, 201, 226, 302, 303, 305, 306, 410, 412, or for programming FPGA 713 and/or interfacing with flash memory 712.

Flash memory 712 is capable of storing data used by FPGA 713, for example data used in generating the orthogonal signals. FPGA 713 is configurable to perform modulation, demodulation, signal correlation, signal generation, frequency estimation, clock recovery, and control signal generation for controlling devices coupled to FPGA 713.

Figure 8:
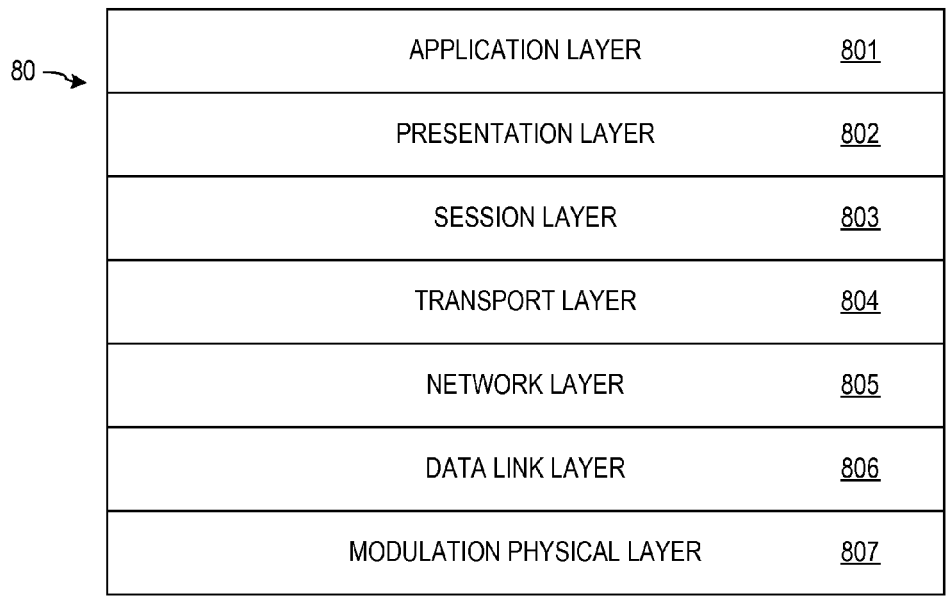
FIG. 8 illustrates a layer-representation of a communication system.

FIG. 8 illustrates a generic layer-representation 80 of a communication system, for example a communication system arranged similarly to communication system 60. Representation 80 comprises an application layer 801, a presentation layer 802, a session layer 803, a transport layer 804, a network layer 805, a data link layer 806, and a modulation layer 807. Application layer 801 is the highest layer in representation 80, and is typically the layer most familiar to communication system users. For example, an internet browser is in application layer 801. Modulation layer 807 comprises the low-level components of a communication system, which are typically hidden from most users. Intermediate layers 802-806 comprise various systems and protocols to enable application layer to make use of modulation layer 807, for example data packet switching systems. MLO operates at modulation layer 807, enhancing the capability of all layers 801-806 above, for example by improving the download speed of an internet browser in application layer 801.

MLO signals used in modulation layer 807 have minimum time-bandwidth products, which enable improvements in spectral efficiency, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. MLO overlays orthogonal signals within a single symbol period. This orthogonality prevents ISI and inter-carrier interference (ICI).

Because MLO works in the baseband layer of signal processing, and some embodiments use QAM architecture, conventional wireless techniques for optimizing air interface, or wireless segments, to other layers of the protocol stack will also work with MLO. Techniques such as channel diversity, equalization, error correction coding, spread spectrum, interleaving and space-time encoding are applicable to MLO. For example, time diversity using a multipath-mitigating rake receiver can also be used with MLO. MLO provides an alternative for higher order QAM, when channel conditions are only suitable for low order QAM, such as in fading channels. MLO can also be used with CDMA to extend the number of orthogonal channels by overcoming the Walsh code limitation of CDMA. MLO can also be applied to each tone in an OFDM signal to increase the spectral efficiency of the OFDM systems.

In contrast, for CDMA, symbols are transmitted dithered in time, and inter-symbol timing is set by a temporal code patterning. The orthogonality of CDMA is inter-symbol, because the symbols for each of multiple users occur at different non-overlapping times. The orthogonality of OFDM is due to displacement of the sub-carriers in the frequency domain, which do not overlap except in the time domain. The orthogonality of MLO does not rely on time displacement, as with CDMA, or on frequency displacement, as with OFDM, but on zero correlation simultaneously in both the time and frequency domains.

Embodiments of MLO systems amplitude modulate a symbol envelope to create sub-envelopes, rather than sub-carriers. For data encoding, each sub-envelope is independently modulated according to N-QAM, resulting in each sub-envelope independently carrying information, unlike OFDM. Rather than spreading information over many sub-carriers, as is done in OFDM, for MLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because MLO is transparent beyond the symbol level. MLO addresses modification of the symbol, but since CDMA and TDMA are spreading techniques of multiple symbol sequences over time. MLO can be used along with CDMA and TDMA.

Figure 9:
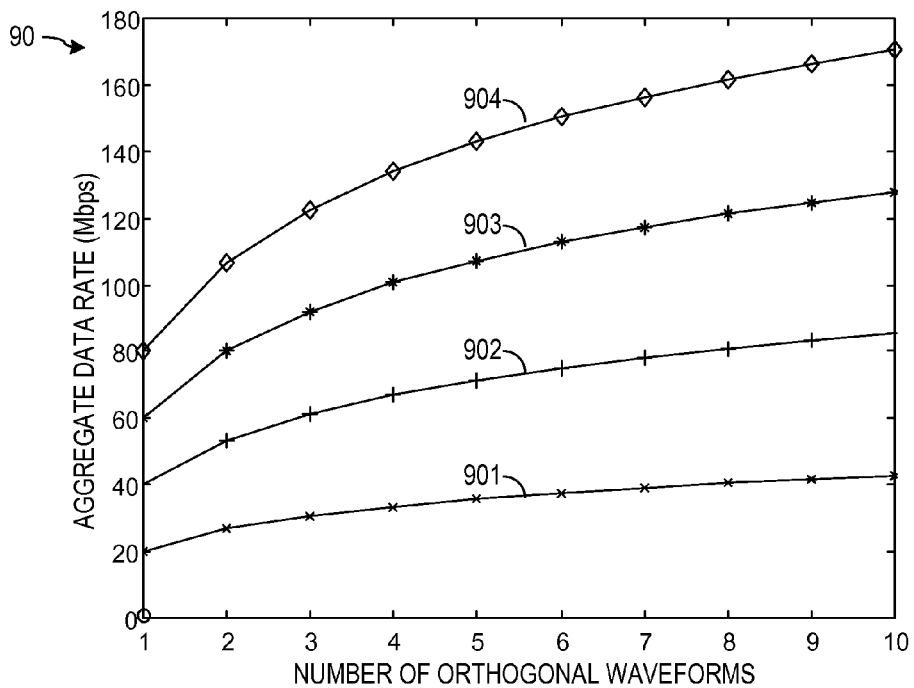
FIG. 9 illustrates a plot of data rate comparisons for various embodiments of MLO systems.

FIG. 9 illustrates a plot 90 of data rate comparisons for various embodiments of MLO systems. Plot 90 illustrates curves 901, 902, 903, and 904 for embodiments of MLO systems using QPSK, 16 QAM, 64 QAM and 256 QAM, respectively, and operating with the same allocated bandwidth. As can be seen in plot 90, the progression from QPSK through increasing orders of QAM results in higher data rates, as expected. However, the spectral efficiency improvements provided by MLO are reflected in the higher data rates possible with an increasing number of orthogonal waveforms used, such as the various $\Psi_n$ waveforms. For example, 16 QAM with ten waveforms permits a higher data rate than 64 QAM with one waveform.

Figure 10:
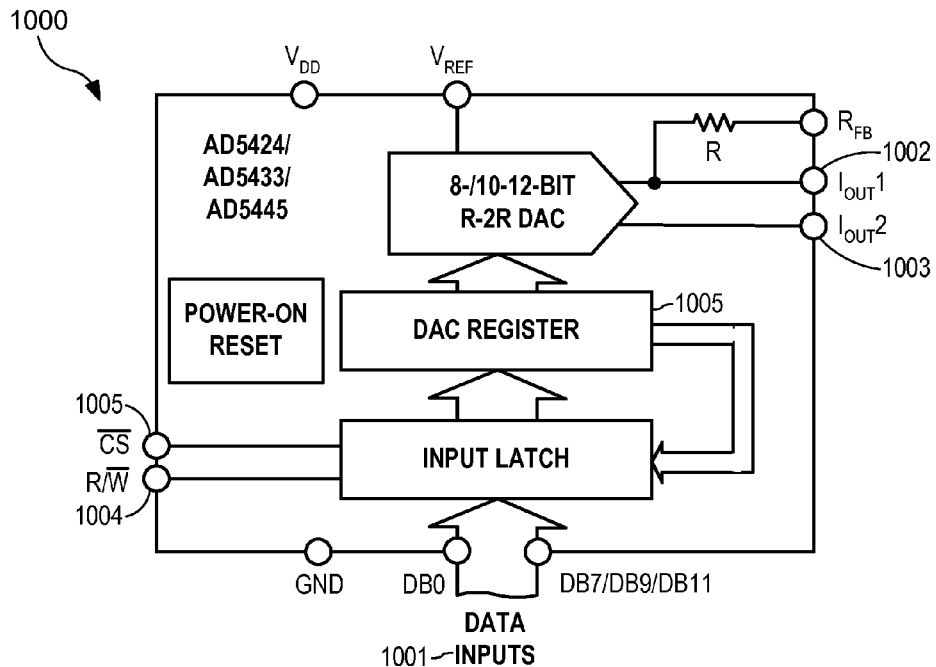
FIG. 10 illustrates a digital to analog converter (DAC) usable in the MLO system shown in FIG. 3.

FIG. 10 illustrates a DAC 1000 usable in an embodiment of an MLO system. For example, DAC 1000 could perform at least some of the functions of DACs 304 and 307 in system 30 shown in FIG. 3. DAC 1000 comprises data input 1001, which may receive a signal such as signal 302 or 305, data outputs 1002 and 1003, which may output a signal such as signal 115 or 119, and control inputs 1004 and 1005, which may receive a control signal such as control signal 303 or 306.

Figure 11:
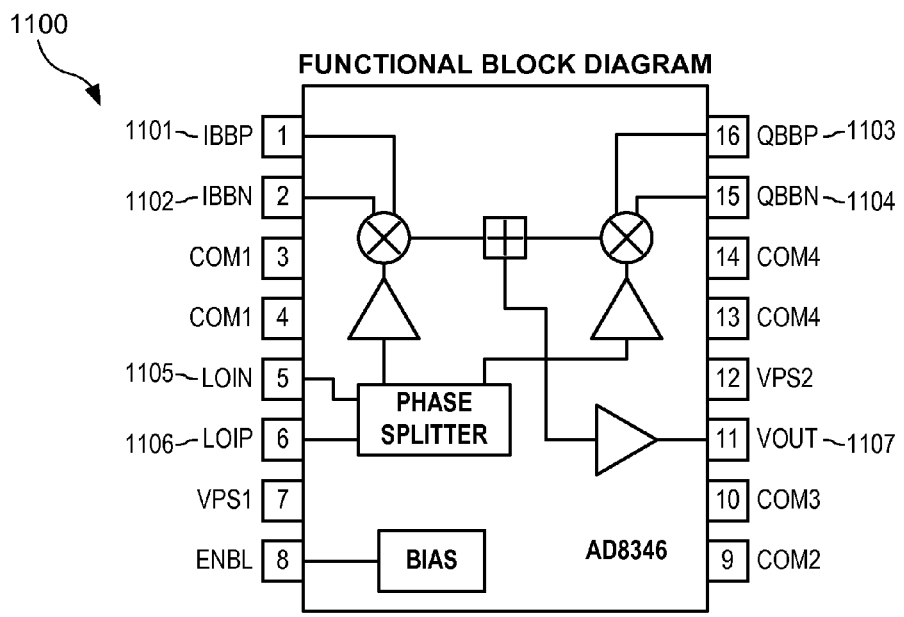
FIG. 11 illustrates a quadrature modulator usable in the MLO system shown in FIG. 3.

FIG. 11 illustrates a quadrature modulator 1100 usable in an embodiment of an MLO system. For example, modulator 1100 could perform at least some of the functions of quadrature modulator 121 in system 30 shown in FIG. 3. Modulator 1100 comprises positive and negative I channel inputs 1101 and 1102, which may receive a signal such as signal 115, positive and negative Q channel inputs 1103 and 1104, which may receive a signal such as signal 119, positive and negative LO inputs 1105 and 1106, which may be coupled to an LO such as LO 120, and data output 1107. It should be understood, however that a quadrature modulator is illustrated as an example, and that a different modulator may be used.

The AD8346 illustrated is a silicon RFIC I/Q modulator for use from 0.8 GHz to 2.5 GHz. Its phase accuracy and amplitude balance allow high performance direct modulation to RF. The differential LO input is applied to a polyphase network phase splitter that provides accurate phase quadrature from 0.8 GHz to 2.5 GHz. Buffer amplifiers are inserted between two sections of the phase splitter to improve the SNR. The I and Q outputs of the phase splitter drive the LO inputs of two Gilbert-cell mixers. Two differential V-to-I converters connected to the baseband inputs provide the baseband modulation signals for the mixers. The outputs of the two mixers are summed together at an amplifier which is designed to drive a 50Ω load. The AD8346 can be used as the transmit modulator in digital systems such as PCS, DCS, GSM, CDMA, and ISM transceivers. The baseband quadrature inputs are directly modulated by the LO signal to produce various QPSK and QAM formats at the RF output.

Figure 12:
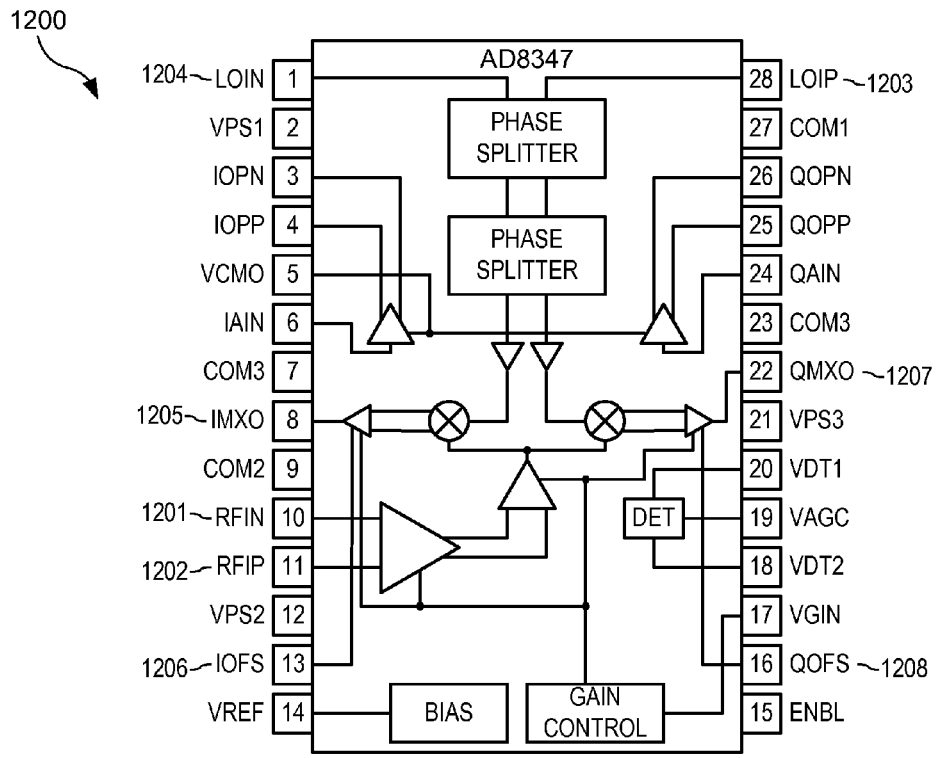
FIG. 12 illustrates a quadrature demodulator usable in the MLO system shown in FIG. 4.

FIG. 12 illustrates a demod 1200 usable in an embodiment of an MLO system. For example, demod 1200 could perform at least some of the functions of demod 221 in system 40 shown in FIG. 4. Demod 1200 comprises positive and negative signal inputs 1201 and 1202, positive and negative LO inputs 1203 and 1204, which may be coupled to an LO such as LO 220, and data outputs 1205-1208.

The AD8346 illustrated is a single chip, broadband 2.7 GHz quadrature demodulator. It integrates 65 dB linear-in-dB automatic gain control (AGC), divided between RF input and at the baseband outputs following the mixers. The I and Q signals are brought out off chip for filtering prior to the final output amplifier stage. The final output amplifiers allow the user to adjust the direct current (DC) common mode level to provide a direct interface into a dual channel I/Q ADC.

Figure 13:
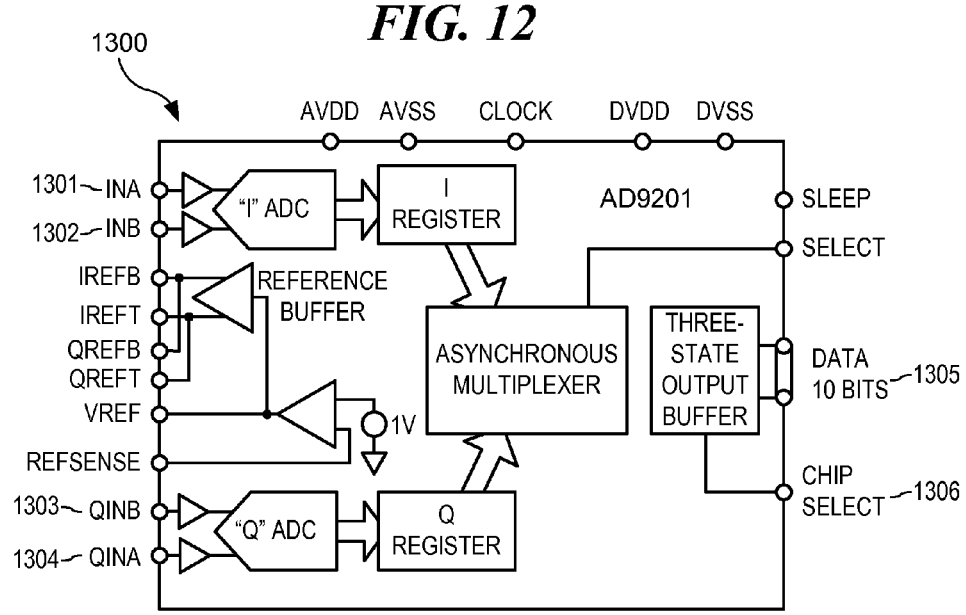
FIG. 13 illustrates an analog to digital converter (ADC) usable in the MLO system shown in FIG. 4.

FIG. 13 illustrates an ADC 1300 usable in an embodiment of an MLO system. For example, ADC 1300 could perform at least some of the functions of ADC 409 in system 40 shown in FIG. 4. ADC 1300 comprises I channel inputs 1301 and 1302, which may receive a signal such as signal 215, Q channel inputs 1303 and 1304, which may receive a signal such as signal 219, output ports 1306, and control port 1306, which may receive a signal such as control signal 412.

The AD9201 illustrated is a dual channel, 20 MSPS, 10-bit CMOS ADC with a frequency range of approximately 2.4 GHz. It is optimized for applications where close matching between two ADCs is required, such as parallel I and Q channels. The 20 MHz sampling rate and input bandwidth cover both narrow-band and spread-spectrum channels. The AD9201 integrates two 10-bit, 20 MSPS ADCs, two input buffer amplifiers, an internal voltage reference and multiplexed digital output buffers.

Figure 14A:
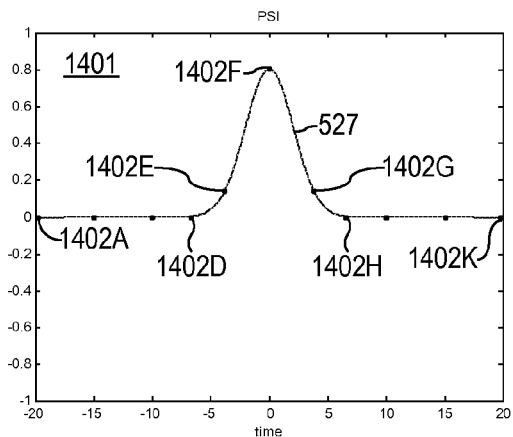
FIGS. 14A-14C illustrate digital representations of the MLO signals of FIGS. 5A-5C.
Figure 14B:
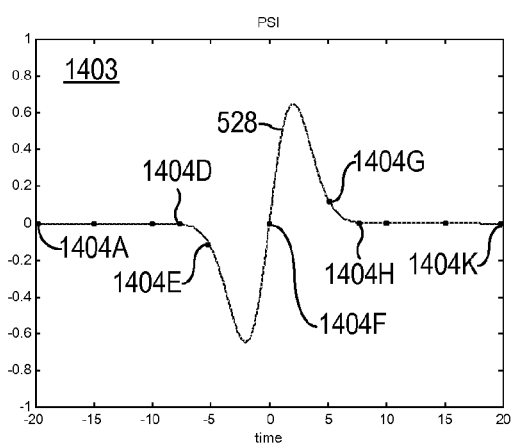
Figure 14C:
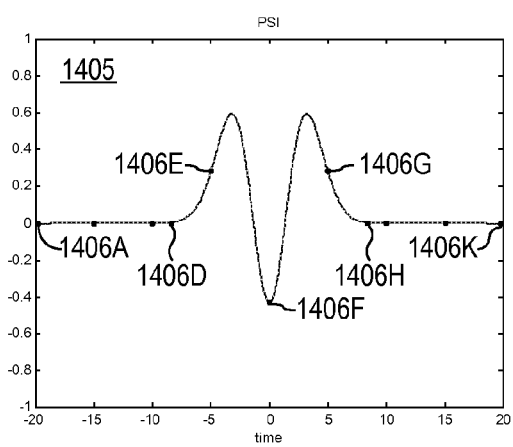

FIGS. 14A-14C show plots 1401, 1403 and 1405, illustrating digital representations of time domain MLO signal curves 527-529 shown in FIGS. 5A-5C, respectively. Plot 1401 comprises points 1402A-1402K, which are quantized points in a digital representation of curve 527. Similarly, plot 1403 comprises points 1404A-1404K, which are quantized points in a digital representation of curve 528, and plot 1405 comprises points 1406A-1406K, which are quantized points in a digital representation of curve 529. As can be seen in plots 1401, 1403 and 1405, the digital representations have the same non-zero time duration. Point 1402D is the last non-zero point in time prior to curve 527 showing an amplitude change, and point 1402H is the first non-zero point after which all subsequent points have zero value. Thus, at least in the digitized representation, curve 527 is non-zero only between points 1402D and 1402H. For curve 528, the non-zero endpoints are 1404D and 1404H, and for curve 529, the non-zero endpoints are 1406D and 1406H. Thus, at least in the digital representations, curves 527-529 have the same non-zero duration. However, it should be understood that in some embodiments, different signals may have different non-zero durations.

Figure 15:
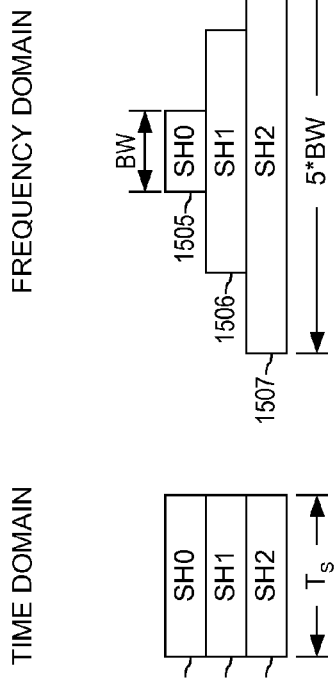
FIG. 15 illustrates a comparison of MLO signal widths in the time and frequency domains.

FIG. 15 illustrates a comparison of MLO signal widths in the time and frequency domains. Time domain envelope representations 1501-1503 of signals SH0-SH3 are illustrated as all having a duration $T_S$. SH0-SH3 may represent $\Psi_0$-$\Psi_2$, or may be other signals. The corresponding frequency domain envelope representations are 1505-1507, respectively. SH0 has a bandwidth BW, SH1 has a bandwidth three times BW, and SH2 has a bandwidth of 5BW, which is five times as great as that of SH0. The bandwidth used by an MLO system will be determined, at least in part, by the widest bandwidth of any of the signals used. If each layer uses only a single signal type within identical time windows, the spectrum will not be fully utilized, because the lower order signals will use less of the available bandwidth than is used by the higher order signals.

Figure 16:
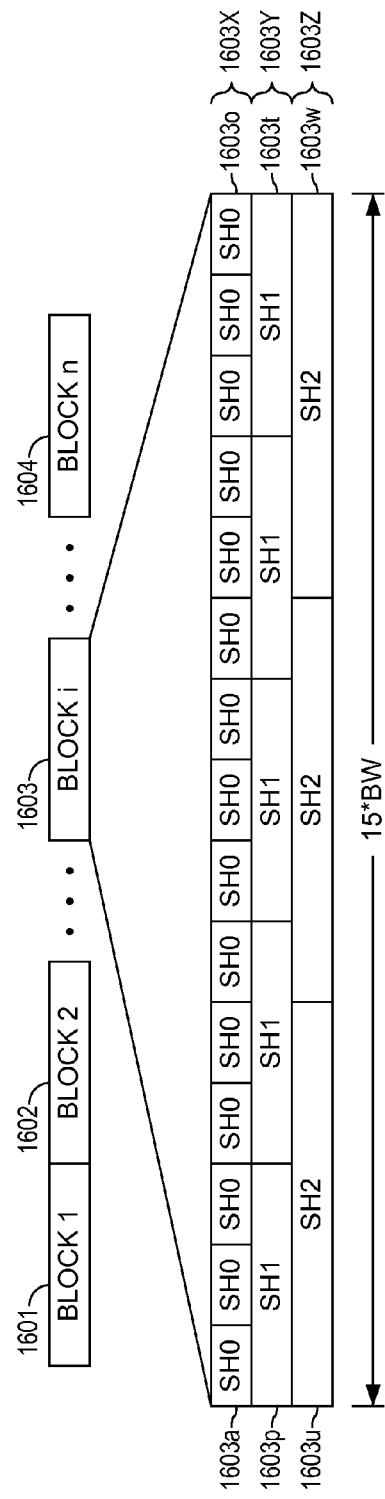
FIG. 16 illustrates a spectral alignment of MLO signals.

FIG. 16 illustrates a spectral alignment of MLO signals that accounts for the differing bandwidths of the signals, and makes spectral usage more uniform, using SH0-SH3. Blocks 1601-1604 are frequency domain blocks of an OFDM signal with multiple subcarriers. Block 1603 is expanded to show further detail. Block 1603 comprises a first layer 1603x comprised of multiple SH0 envelopes 1603a-1603o. A second layer 1603y of SH1 envelopes 1603p-1603t has one third the number of envelopes as the first layer. In the illustrated example, first layer 1603x has 15 SH0 envelopes, and second layer 1603y has five SH1 envelopes. This is because, since the SH1 bandwidth envelope is three times as wide as that of SH0, 15 SH0 envelopes occupy the same spectral width as five SH1 envelopes. The third layer 1603z of block 1603 comprises three SH2 envelopes 1603u-1603w, because the SH2 envelope is five times the width of the SH0 envelope.

The total required bandwidth for such an implementation is a multiple of the least common multiple of the bandwidths of the MLO signals. In the illustrated example, the least common multiple of the bandwidth required for SH0, SH1, and SH2 is 15BW, which is a block in the frequency domain. The OFDM-MLO signal can have multiple blocks, and the spectral efficiency of this illustrated implementation is proportional to (15+5+3)/15.

Figure 17:
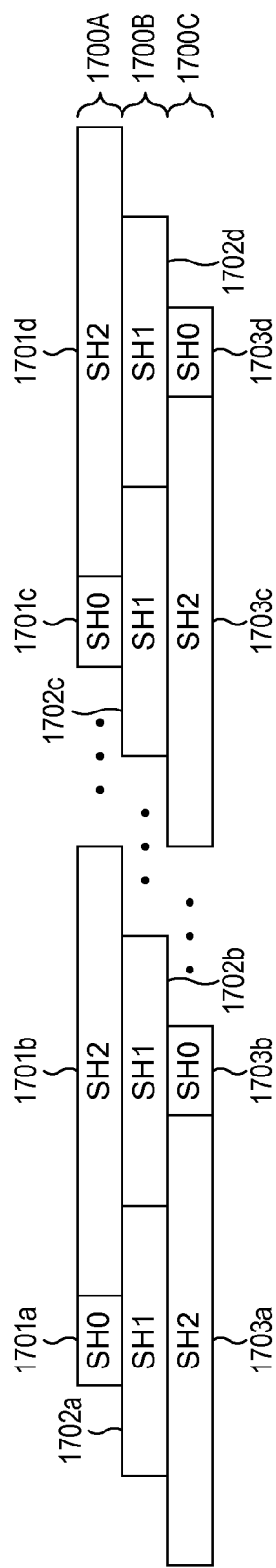
FIG. 17 illustrates another spectral alignment of MLO signals.

FIG. 17 illustrates another spectral alignment of MLO signals, which may be used alternatively to alignment scheme shown in FIG. 16. In the embodiment illustrated in FIG. 17, the OFDM-MLO implementation stacks the spectrum of SH0, SH1, and SH2 in such a way that the spectrum in each layer is utilized uniformly. Layer 1700a comprises envelopes 1701a-1701d, which includes both SH0 and SH2 envelopes. Similarly, layer 1700c, comprising envelopes 1703a-a703d, includes both SH0 and SH2 envelopes. Layer 1700b, however, comprising envelopes 1702a-1702d, includes only SH1 envelopes. Using the ratio of envelope sizes described above, it can be easily seen that BW+5BW=3BW+3BW. Thus, for each SH0 envelope in layer 1700a, there is one SH2 envelope also in layer 1700a and two SH1 envelopes in layer 1700b.

In this illustrated example, the total required bandwidth is (3N+2) BW, where N is the number of basic building blocks, and the spectral efficiency of this implementation is proportional to 3N/(3N+2). FIGS. 16 and 17 are intended to be illustrative only, and it should be understood that the various signal envelopes may be combined and layered multiple ways in order to create a spectrally efficient arrangement.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:
1. A communication method comprising:
receiving an input data stream;
demultiplexing the input data stream into a plurality of separated data streams;
wherein first parallel data streams of said plurality of separated data streams comprises a first in-phase (I) stream and a first quadrature-phase (Q) stream;

modulating the first parallel data streams with a function selected from a plurality of at least three mutually orthogonal functions at a first signal width to generate a plurality of first data sub-layers;

wherein second parallel data streams of said plurality of separated data streams comprises a second in-phase (I) stream and a second quadrature-phase (Q) stream;

modulating the second parallel data streams with the function selected from said plurality of at least three mutually orthogonal functions at a second signal width to generate a plurality of second data sub-layers;

wherein the second signal width is different from the first signal width;

calculating a suitable spectral power density for said first data layer and said second data layer, said suitable spectral power density selected to minimize interference between a first data layer and a second data layer; and generating a composite data stream by overlaying said first data layer with said second data layer at a preconfigured overlay offset, wherein the first data layer comprises of said plurality of first data sub-layers and a plurality of third data sub-layers and the second data layer comprises of said plurality of second data sub-layers.

2. The method of claim 1 wherein the plurality of at least three mutually orthogonal functions comprises a plurality of time-limited and band-limited functions.

3. The method of claim 1 wherein the plurality of at least three mutually orthogonal functions comprises a plurality of modified Hermite polynomials.

4. The method of claim 1 wherein the plurality of at least three mutually orthogonal functions comprises a plurality of functions selected from the list consisting of: Jacobi polynomials, Gegenbauer polynomials, Legendre polynomials, Chebyshev polynomials, Laguerre polynomials, and Q-functions.

5. The method of claim 1 further comprising:

mapping each of the separated data streams to a set of quadrature amplitude modulation (QAM) symbols to generate the first parallel data streams and the second parallel data streams.

6. The method of claim 5 wherein modulating each of the first parallel data streams with a function comprising: weighting the function based on a mapped symbol.

* * * * *